US009557728B2

(12) United States Patent
Terada et al.

(10) Patent No.: US 9,557,728 B2
(45) Date of Patent: *Jan. 31, 2017

(54) NUMERICAL CONTROL APPARATUS

(75) Inventors: Koji Terada, Tokyo (JP); Masakazu Sagasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 862 days.

This patent is subject to a terminal disclaimer.

(21) Appl. No.: 13/977,857

(22) PCT Filed: Feb. 3, 2011

(86) PCT No.: PCT/JP2011/052287
§ 371 (c)(1),
(2), (4) Date: Jul. 1, 2013

(87) PCT Pub. No.: WO2012/105028
PCT Pub. Date: Aug. 9, 2012

(65) Prior Publication Data
US 2014/0114465 A1 Apr. 24, 2014

(51) Int. Cl.
*G05B 19/18* (2006.01)
*G05B 19/408* (2006.01)
(52) U.S. Cl.
CPC .......... *G05B 19/18* (2013.01); *G05B 19/4083* (2013.01); *G05B 2219/36234* (2013.01); *G05B 2219/50249* (2013.01)
(58) Field of Classification Search
CPC .......... G05B 2219/36234; G05B 2219/50249
See application file for complete search history.

(56) References Cited

U.S. PATENT DOCUMENTS

| 4,635,340 A | 1/1987 | Link |
| 4,683,787 A | 8/1987 | Link |
| 4,811,235 A | 3/1989 | Shirakata |
| RE33,732 E | 11/1991 | Link |

(Continued)

FOREIGN PATENT DOCUMENTS

| JP | 59-33507 A | 2/1984 |
| JP | 59-205206 A | 11/1984 |

(Continued)

OTHER PUBLICATIONS

Notice of Rejection, dated Sep. 14, 2011, JP Appln No. 2011-525343.

*Primary Examiner* — Ryan Jarrett
(74) *Attorney, Agent, or Firm* — Sughrue Mion, PLLC; Richard C. Turner

(57) ABSTRACT

A numerical control apparatus controls a machine tool including an X axis for moving a turret to which a plurality of tools are attached, a H axis for rotating the turret, and a C axis for rotating a work and not including a Y axis orthogonal to the X axis. The numerical control apparatus includes a unit configured to independently rotate the H axis according to an independent rotation command for the H axis and perform tool replacement during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command.

6 Claims, 14 Drawing Sheets

(56) References Cited

U.S. PATENT DOCUMENTS

| | | | | |
|---|---|---|---|---|
| 7,433,754 B2* | 10/2008 | Otsuki | ............... | G05B 19/4103 |
| | | | | 700/159 |
| 8,000,838 B2* | 8/2011 | Bhatt | .................... | B25J 9/1658 |
| | | | | 318/568.19 |
| 8,255,078 B2* | 8/2012 | Otsuki | ............... | G05B 19/4103 |
| | | | | 700/186 |
| 2013/0257340 A1* | 10/2013 | Sagasaki | ............ | G05B 19/4067 |
| | | | | 318/569 |

FOREIGN PATENT DOCUMENTS

| | | | |
|---|---|---|---|
| JP | 62-163109 | A | 7/1987 |
| JP | 64-40206 | A | 2/1989 |
| JP | 2-41801 | A | 2/1990 |
| JP | 3-33441 | B2 | 5/1991 |
| JP | 4-171104 | A | 6/1992 |
| JP | 5-108134 | A | 4/1993 |
| JP | 6-99306 | A | 4/1994 |
| JP | 6-332524 | A | 12/1994 |
| JP | 6-348329 | A | 12/1994 |
| JP | 2000-218422 | A | 8/2000 |
| JP | 2004-30422 | A | 1/2004 |
| JP | 2005-305579 | A | 11/2005 |

* cited by examiner

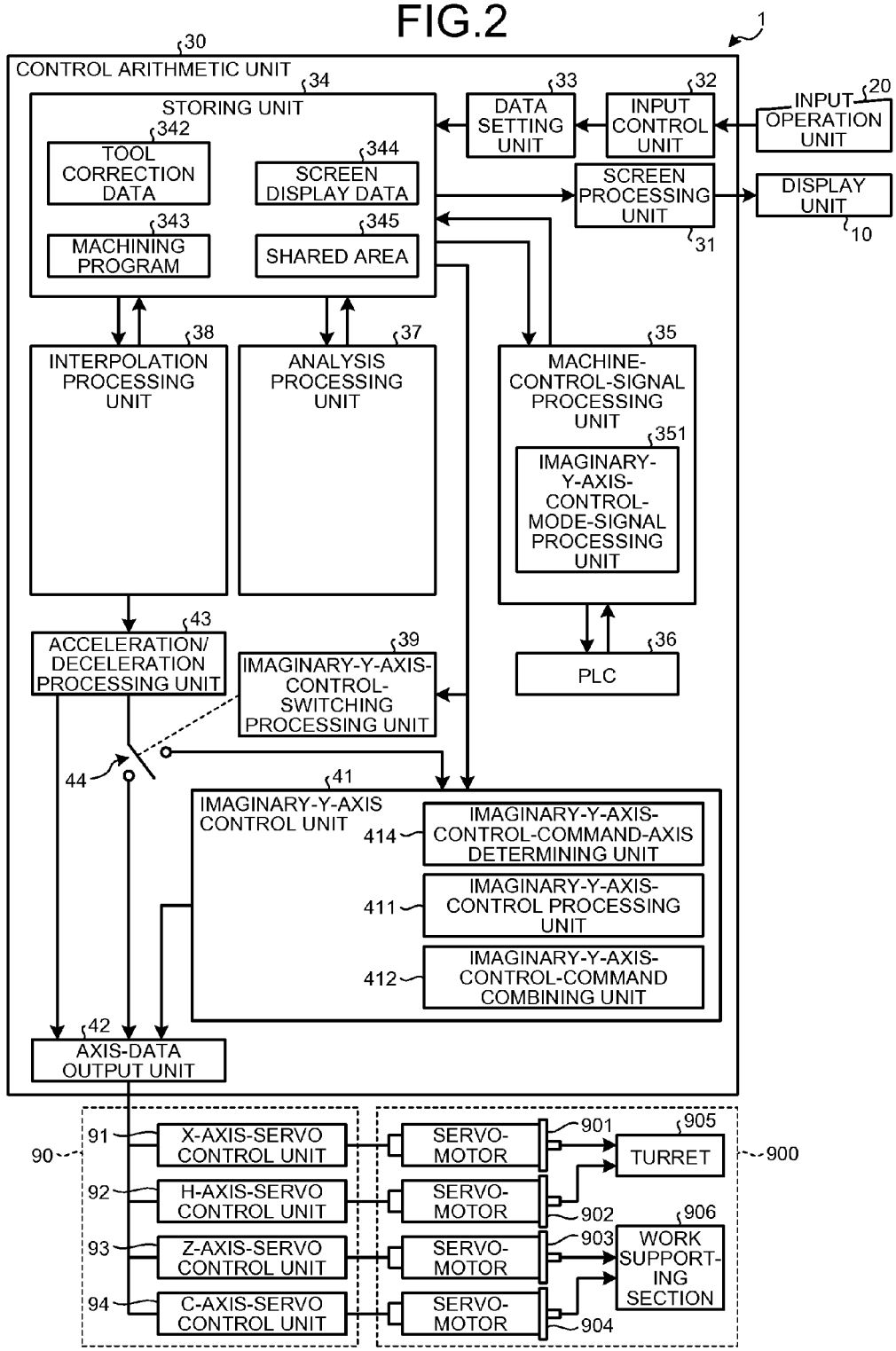

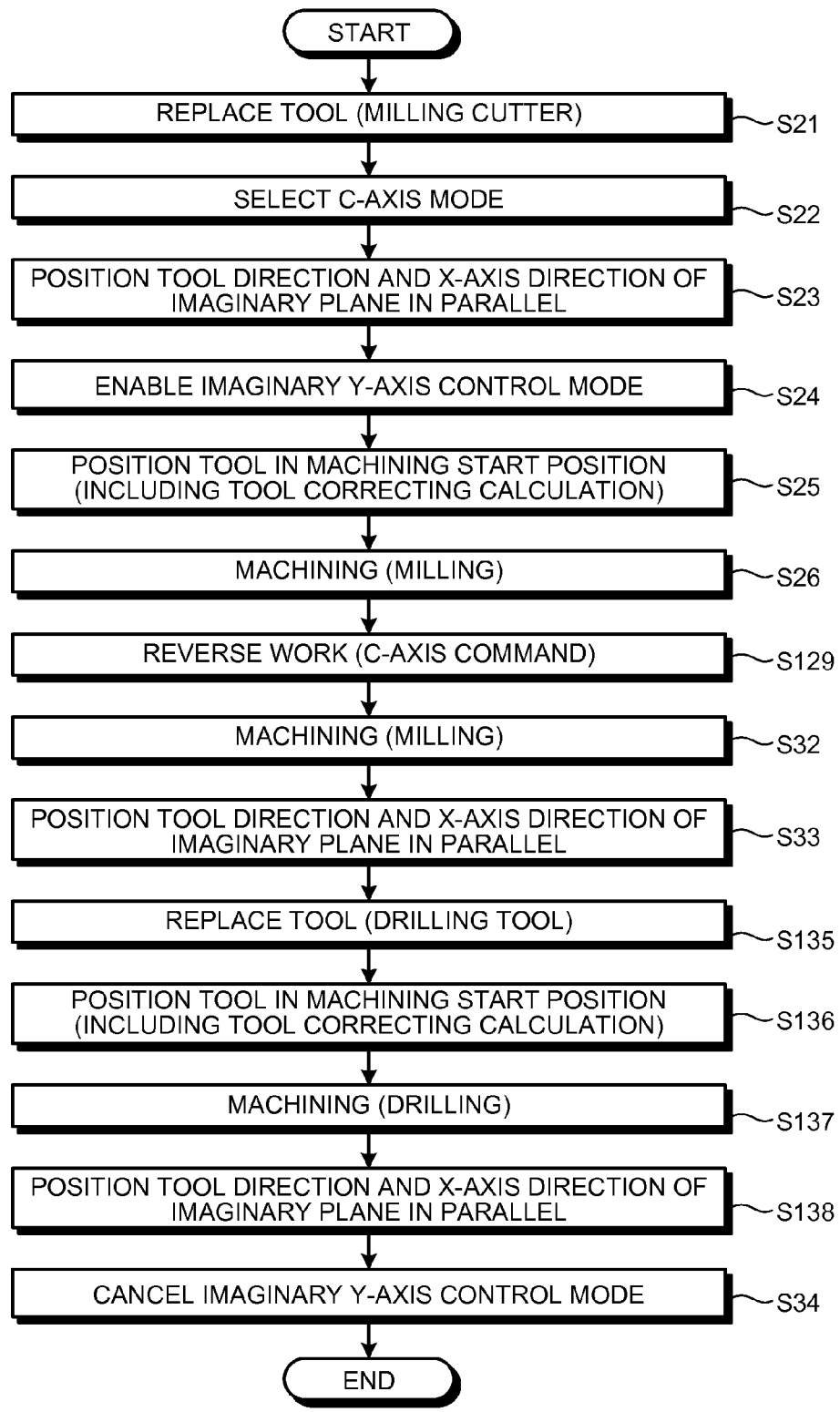

FIG.5

```
N100 T1010                    ······REPLACE TOOL WITH MILLING CUTTER (S21)
N101 G90
N102 G00 C0                   ······SELECT C-AXIS MODE (S22)
N103 G00 X60 H0 Z0            ······POSITION TOOL DIRECTION AND IMAGINARY PLANE X-AXIS DIRECTION IN PARALLEL (S23)
N104 M111                     ······IMAGINARY Y-AXIS CONTROL MODE COMMAND (YD11=1) (S24)
N105 G94 G17                  ······CANCEL SYNCHRONIZATION FEED MODE, SELECT PLANE OF END FACE MACHINING
N106 G00 X20 Y50              ······MOVE TO MACHINING START POSITION (S25)
N107 G01 X20 Y-50 F1000       ······MILLING (S26)
N108 G00 X30                  ······RETRACT X AXIS
N109 G00 C180                 ······REVERSE WORK (S129)
N110 G00 X20 Y-50             ······MACHINING START POSITION
N111 G01 X20 Y50              ······MILLING (S32)
N112 G00 X30                  ······RETRACT X AXIS
N113 G00 Y0                   ······POSITION TOOL DIRECTION AND IMAGINARY PLANE X-AXIS DIRECTION IN PARALLEL (S33)
N114 T1111                    ······TURN TURRET ROTATION AXIS AND REPLACE TOOL WITH DRILLING TOOL (S135)
N115 G00 X20 Y10              ······MOVE TO MACHINING START POSITION (S136)
N116 G83 X5 D40 H3 F100       ······DRILLING FIXED CYCLE (S137)
N117 G00 X30 Y0               ······POSITION TOOL DIRECTION AND IMAGINARY PLANE X-AXIS DIRECTION IN PARALLEL (S138)
N118 M101                     ······CANCEL IMAGINARY Y-AXIS CONTROL MODE (YD11 = 0) (S34)
N119 G53 X100 H0 C0
  ..
```

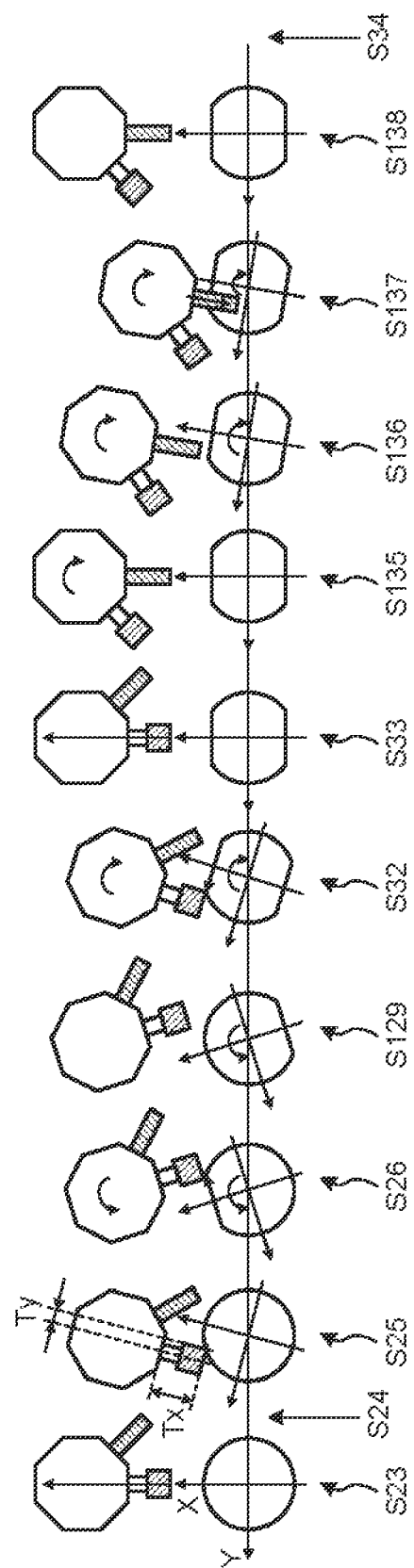

FIG.8

```
N210 G00 Y0              ...POSITION TOOL DIRECTION AND IMAGINARY PLANE X-AXIS DIRECTION IN PARALLEL (S33)
N211 G00 X20 Y10 T1111   ...TURN TURRET ROTATION AXIS, REPLACE TOOL WITH DRILLING TOOL,
                            AND MOVE TO MACHINING START POSITION (S235)
..
N212  G83 X5 D40 H3 F100 ...DRILLING FIXED CYCLE (S137)
..
```

```
N310 G00 Y0              ···POSITION TOOL DIRECTION AND IMAGINARY PLANE
                            X-AXIS DIRECTION IN PARALLEL (S33)
N311 G00 X20 Y10 C-180 T1111 ···TURN TURRET ROTATION AXIS, REPLACE TOOL WITH
                            DRILLING TOOL, TURN (REVERSE)
                            WORK AXIS, AND MOVE TO MACHINING START POSITION
                            (S335)
N312 G83 X5 D40 H3 F100  ···DRILLING FIXED CYCLE (S137)
```

FIG.15

```
N10 T1010            ······REPLACE TOOL WITH MILLING CUTTER (S21)
N11 G90
N12 G00 C0           ·······SELECT C-AXIS MODE (S22)
N13 G00 X60 H0 Z0    ·······POSITION TOOL DIRECTION AND IMAGINARY PLANE X-AXIS DIRECTION IN PARALLEL (S23)
N14 M11              ·······IMAGINARY Y-AXIS CONTROL MODE COMMAND (S24)
N15 G94 G17          ·······CANCEL SYNCHRONIZATION FEED MODE, SELECT PLANE OF END FACE MACHINING
N16 G00 X20 Y50      ·······MOVE TO MACHINING START POSITION (S25)
N17 G01 X20 Y-50 F1000 ······MILLING (S26)
N18 G00 X30          ·······RETRACT X AXIS
N19 G00 Y0           ·······POSITION TOOL DIRECTION AND IMAGINARY PLANE X-AXIS DIRECTION IN PARALLEL (S27)
N20 M10              ·······CANCEL IMAGINARY Y-AXIS CONTROL MODE (S28)
N21 G00 C180         ·······REVERSE WORK (C-AXIS) (S29)
N22 M11              ·······IMAGINARY Y-AXIS CONTROL MODE COMMAND (S30)
N23 G00 X20 Y-50     ·······MOVE TO MACHINING START POSITION (S31)
N24 G01 X20 Y50      ·······MILLING (S32)
N25 G00 X30          ·······RETRACT X AXIS
N26 G00 Y0           ·······POSITION TOOL DIRECTION AND IMAGINARY PLANE X-AXIS DIRECTION IN PARALLEL (S33)
N27 M10              ·······CANCEL IMAGINARY Y-AXIS CONTROL MODE (S34)
  ..
```

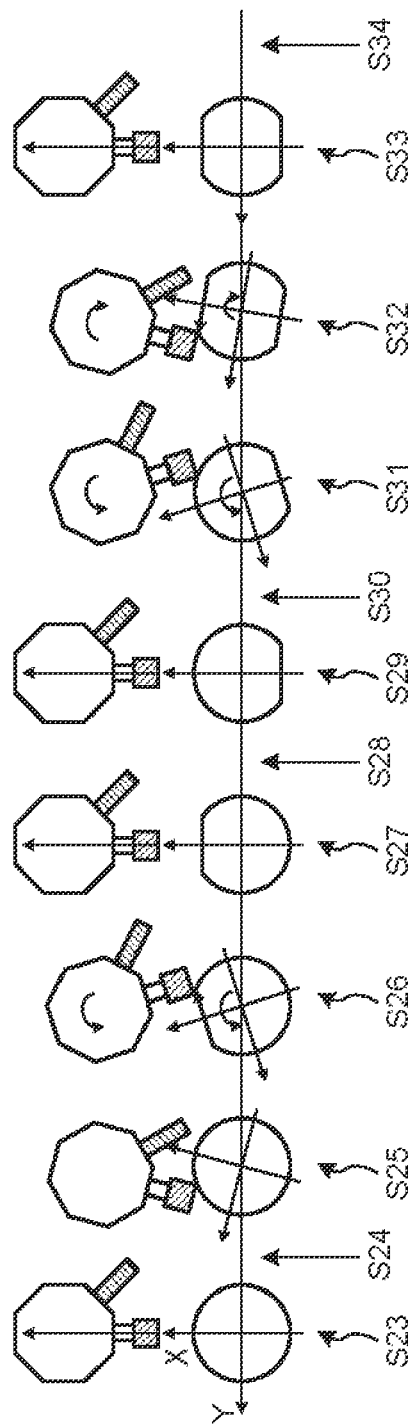

NUMERICAL CONTROL APPARATUS

CROSS REFERENCE TO RELATED APPLICATIONS

This application is a National Stage of International Application No. PCT/JP2011/052287filed Feb. 3, 2011, the contents of all of which are incorporated herein by reference in their entirety.

FIELD

The present invention relates to a numerical control apparatus.

BACKGROUND

Patent Literature 1 describes an NC turret lathe not including a Y axis. The NC turret lathe includes a Z axis for performing feeding action of a work, a C axis for performing rotation of the work, an X axis perpendicular to the Z axis and for performing feeding action for a tool turret, and a turret rotation axis for performing rotation of the tool turret. However, the NC turret lathe does not include the Y axis perpendicular to the Z axis and the X axis. In such an NC turret lathe, the rotation of the C axis and the rotation of the turret rotation axis are performed in combination to generate feeding action for the tool in the Y axis direction with respect to the work. Consequently, according to Patent Literature 1, it is possible to execute machining action using the NC turret lathe not including the Y axis as if the NC turret had the Y axis.

CITATION LIST

Patent Literature

Patent Literature 1: Japanese Patent Publication No. H3-33441

SUMMARY

Technical Problem

In control for performing machining as if a machine tool had a Y axis, i.e., imaginary Y-axis control, rotation of the C axis, rotation of the turret rotation axis, and feeding action of the X axis are performed in association with one another. Even if it is attempted to independently perform the rotation of the C axis during Y-axis control, the rotation of the turret rotation axis and the feeding action of the X axis are simultaneously caused in association of the rotation of the C axis. Therefore, when it is desired to perform positioning of a work (independent rotation of the C axis), the numerical control apparatus needs to perform the positioning of the work after once cancelling the imaginary Y-axis control. That is, when continuing machining by the imaginary Y-axis control while performing the positioning of the work, every time one machining (machining process) ends, the numerical control apparatus returns to a position where the positioning of the work can be performed (positions a tool direction and an imaginary plane X-axis direction in parallel), cancels the imaginary Y-axis control, performs the positioning of the work (the independent rotation of the C axis) after the cancellation, and enables the imaginary Y-axis control again. Therefore, cycle time of the machining tends to be long.

Alternatively, even if it is attempted to independently perform the rotation of the turret rotation axis during the imaginary Y-axis control, the rotation of the C axis and the feeding action of the X axis are simultaneously caused in association with the rotation of the turret rotation axis. Therefore, when it is desired to perform tool replacement (independent rotation of the turret rotation axis), the numerical control apparatus needs to perform the tool replacement after once cancelling the imaginary Y-axis control. That is, when continuing the machining by the imaginary Y-axis control while performing the tool replacement, every time one matching (machining process) ends, the numerical control apparatus returns to a tool replacement position, cancels the imaginary Y-axis control, performs the tool replacement (the independent rotation of the turret rotation axis) after the cancellation, and enables the imaginary Y-axis control again. Therefore, cycle time of the machining tends to be long.

The present invention has been devised in view of the above and it is an object of the present invention to obtain a numerical control apparatus that can reduce cycle time of machining.

Solution to Problem

There is provided a numerical control apparatus that controls a machine tool including an X axis for moving a turret to which a plurality of tools are attached, a H axis for rotating the turret, and a C axis for rotating a work and not including a Y axis orthogonal to the X axis, the numerical control apparatus comprising a unit configured to independently rotate the H axis according to an independent rotation command for the H axis and to perform tool replacement during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command.

Advantageous Effects of Invention

According to the present invention, it is possible to perform tool replacement without cancelling imaginary Y-axis control. Consequently, because the number of processes in a series of machining can be reduced, it is possible to reduce cycle time of the machining.

BRIEF DESCRIPTION OF DRAWINGS

FIG. 2 is a diagram of the configuration of a numerical control apparatus according to the first embodiment.

FIG. 4 is a flowchart for explaining a machining procedure for a work in the first embodiment.

FIG. 5 is a diagram for explaining a machining program in the first embodiment.

FIG. 6 is a diagram for explaining the machining procedure for the work in the first embodiment.

FIG. 8 is a diagram for explaining a machining program in the second embodiment.

FIG. 15 is a diagram for explaining a machining program in the comparative example.

FIG. 16 is a diagram for explaining the machining procedure for the work in the comparative example.

DESCRIPTION OF EMBODIMENTS

Embodiments of a numerical control apparatus according to the present invention are explained in detail below based on the drawings. The invention is not limited by the embodiments.

First Embodiment.

A schematic configuration of a numerical control apparatus 1 according to a first embodiment is explained with reference to FIGS. 1 and 2. FIGS. 1A and 1B are respectively a perspective view and a front view of an external configuration of a machine tool 900 controlled by the numerical control apparatus 1. FIG. 2 is a block diagram of the configuration of the numerical control apparatus 1.

Figure 1A:
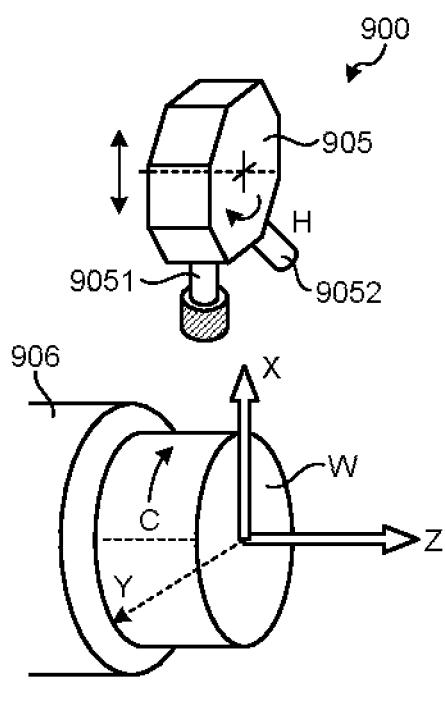
FIG. 1 is a diagram of external configurations of a work supporting section and a turret in a first embodiment.
Figure 1B:
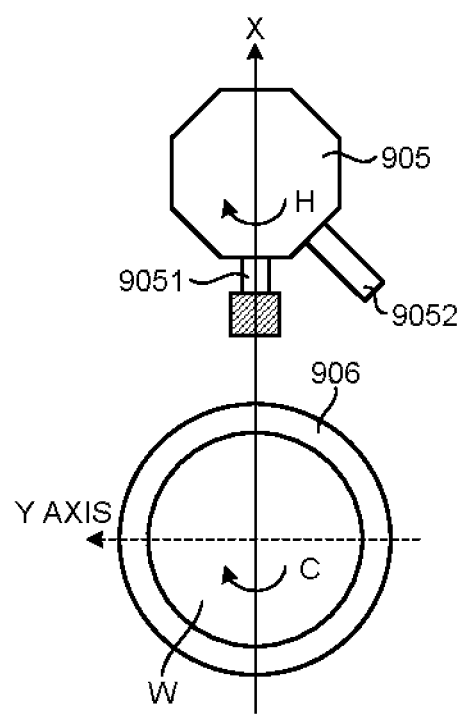

As shown in FIGS. 1A and 1B, the machine tool 900 includes a turret 905 and a work supporting section 906. The machine tool 900 includes an X axis, a Z axis, an H axis, and a C axis. The X axis is a movement axis for moving the turret 905. The Z axis is a movement axis for moving a work W. The H axis is a rotation axis for rotating the turret 905 to turn tools 9051 and 9052. The C axis is a rotation axis for rotating the work W.

In FIGS. 1A and 1B, a Y axis perpendicular to the X axis and the Z axis is indicated by a broken line. The Y axis is an imaginary movement axis used in an imaginary Y-axis control mode in a machining program 343 created by a user. In the imaginary Y-axis control mode, the user designates coordinate positions of the X axis, the Y axis, the H axis, and the C axis and creates a required machining program 343. The user creates, without taking into account rotation of the H axis and the C axis, the machining program 343 by designating, for example, X-Y coordinates assuming a state indicated by an arrow at S23 in FIG. 6, i.e., a state in which a tool direction and an imaginary plane X axis coincide with each other. In the machining program 343, for example, an X-axis command is described as "X20", a Y-axis command is described as "Y10", a C-axis command is described as "C-180", and an H-axis command is described as "T1111" (see FIG. 5).

As shown in FIG. 2, the machine tool 900 further includes X-axis, H-axis, Z-axis, and C-axis servomotors 901, 902, 903, and 904. The X-axis servomotor 901 and the H-axis servomotor 902 apply movement of the X axis and rotation of the H axis to the turret 905. The Z-axis servomotor 903 and the C-axis servomotor 904 apply movement of the Z axis and rotation of the C axis to the work supporting section 906.

The numerical control apparatus 1 includes a display unit 10, an input operation unit 20, a control arithmetic unit 30, and a driving unit 90. For example, according to operation of an automatic startup button of the machining program 343 by the user, a signal of automatic startup of the machining program 343 is supplied to the control arithmetic unit 30. According to the signal, the control arithmetic unit 30 starts up the machining program 343 and, according to the machining program 343, generates a movement amount command for the X axis, a rotation amount command for the H axis, a movement amount command for the Z axis, and a rotation amount command for the C axis and supplies the commands to the driving unit 90. The driving unit 90 includes an X-axis-servo control unit 91, an H-axis-servo control unit 92, a Z-axis-servo control unit 93, and a C-axis-servo control unit 94. The driving unit 90 drives the X-axis servomotor 901, the H-axis servomotor 902, the Z-axis servomotor 903, and the C-axis servomotor 904 according to the movement amount command for the X axis the rotation amount command for the H axis, the movement amount command for the Z axis, and the rotation amount command for the C axis input from the control arithmetic unit 30. The control arithmetic unit 30 receives feedback position data (FB position data: coordinate positions of the X axis, the H axis, the Z axis, and the C axis in a machine coordinate system established from data of the position sensors) from an X-axis position sensor 95, an H-axis position sensor 96, a Z-axis position sensor 97, and a C-axis position sensor 98 through the driving unit 90.

An internal configuration of the control arithmetic unit 30 is explained.

The control arithmetic unit 30 includes a PLC 36, a machine-control-signal processing unit 35, a storing unit 34, an analysis processing unit 37, an interpolation processing unit 38, an imaginary-Y-axis-control-switching processing unit 39, a switch 44, an acceleration/deceleration processing unit 43, an imaginary-Y-axis control unit 41, an axis-data output unit 42, an input control unit 32, a screen processing unit 31, and a data setting unit 33.

The signal of the automatic startup of the machining program 343 is input to the machine-control-signal processing unit 35 through the PLC 36. The machine-control-signal processing unit 35 instructs, through the storing unit 34, the analysis processing unit 37 to start up the machining program 343.

The storing unit 34 stores tool correction data 342, the machining program 343, and screen display data 344 and includes a shared area 345 as a work space.

The analysis processing unit 37 calculates tool correction amounts (Tx, Ty) (see FIG. 6) and causes the storing unit 34 to store the tool correction amounts (Tx, Ty) as tool correction data 342. The analysis processing unit 37 reads out, according to a startup instruction of the machining program 343, the machining program 343 from the storing unit 34 and performs analysis processing concerning respective blocks (respective rows) of the machining program 343. If an M code (e.g., an M code "M111" shown in FIG. 5) is included in an analyzed block (row), the analysis processing unit 37 passes a result of the analysis to the PLC 36 through the storing unit 34 and the machine-control-signal processing unit 35. If a code (e.g., a G code "G01" shown in FIG. 5) other than the M code is included in the analyzed row, the analysis processing unit 37 adds the tool correction amounts (Tx, Ty) to a result of the analysis and passes the analysis result to the interpolation processing unit 38.

When receiving the analysis result (e.g., the M code "M111" shown in FIG. 5), the PLC 36 changes an imaginary Y-axis control mode signal included in the imaginary-Y-axis-control-mode-signal processing unit 351 in the machine-control-signal processing unit 35 to an ON state and causes the shared area 345 of the storing unit 34 to temporarily store the imaginary Y-axis control mode signal. Consequently, in the numerical control apparatus 1, the imaginary Y-axis control mode is started and the units refer to the imaginary Y-axis control mode signal (ON state) of the shared area 345 to thereby recognize that the numerical control apparatus 1 is in the imaginary Y-axis control mode. When receiving an analysis result of imaginary Y-axis control mode OFF (e.g., an M code "M101" shown in FIG. 5), the PLC 36 changes the imaginary Y-axis control mode signal included in the imaginary-Y-axis-control-mode-signal processing unit 351 in the machine-control-signal processing unit 35 to an OFF state and causes the shared area to temporarily store the imaginary Y-axis control mode signal. Consequently, in the numerical control apparatus 1, the imaginary Y-axis control mode is cancelled. The numerical control apparatus 1 changes to a normal control mode other than the imaginary Y-axis control mode.

The interpolation processing unit 38 receives an analysis result (a position command) from the analysis processing unit 37, performs interpolation processing for the analysis result (the position command), and supplies a result of the interpolation processing (a movement amount and a rotation amount) to the acceleration/deceleration processing unit 43.

The acceleration/deceleration processing unit 43 applies acceleration/deceleration processing to a result of the interpolation processing supplied from the interpolation processing unit 38. The acceleration/deceleration processing unit 43 outputs acceleration/deceleration processing results concerning the X axis, the Y axis, the C axis, and the H axis to the switch 44 and directly outputs an acceleration/deceleration processing result concerning the Z axis to the axis-data-output unit 42.

The switch 44 outputs, based on a switching signal from the imaginary-Y-axis-control-switching processing unit 39, the acceleration/deceleration processing results to the imaginary-Y-axis control unit 41 or the axis-data output unit 42. The imaginary-Y-axis-control-switching processing unit 39 switches the switch 44 to connect the acceleration/deceleration processing unit 43 and the imaginary-Y-axis control unit 41 in the imaginary Y-axis control mode in which the imaginary Y-axis control mode signal of the shared area 345 is ON. The imaginary-Y-axis-control-switching processing unit 39 switches the switch 44 to connect the acceleration/deceleration processing unit 43 and the axis-data output unit 42 in a control mode other than the imaginary Y-axis control mode in which the imaginary Y-axis control mode signal of the shared area 345 is OFF.

The imaginary-Y-axis control unit 41 executes control processing in the imaginary Y-axis control mode. Specifically, the imaginary-Y-axis control unit 41 converts the X-axis, Y-axis, C-axis, and H-axis commands subjected to the acceleration/deceleration processing into X-axis, C-axis, and H-axis commands in the machine coordinate system and inputs the converted X-axis, C-axis, and H-axis commands to the axis-data output unit 42. In the imaginary Y-axis control mode, usually, the X axis, the H axis, and the C axis act in association with one another.

The imaginary-Y-axis control unit 41 includes an imaginary-Y-axis-control-command-axis determining unit 414, an imaginary-Y-axis-control processing unit 411, and an imaginary-Y-axis-control-command combining unit 412.

The imaginary-Y-axis-control-command-axis determining unit 414 determines, under the imaginary Y-axis control mode, referring to, for each one block (one row), a machining program stored in the storing unit 34, whether commands of respective blocks (respective rows) are a movement amount command for the X-Y axes or an independent rotation amount command for the H axis or the C axis. When a command by the machining program 343 is the movement amount command for the X-Y axes (e.g., a movement amount command by "G00 X20 Y50" shown in FIG. 5), the imaginary-Y-axis-control-command-axis determining unit 414 supplies the movement amount command for the X-Y axes, which is input from the acceleration/deceleration processing unit 43, to the imaginary-Y-axis-control processing unit 411. When the command by the machining program 343 is the independent rotation amount command for the H axis or the C axis (e.g., an independent rotation amount command by "T1111" or "C180" shown in FIG. 5), the imaginary-Y-axis-control-command-axis determining unit 414 supplies the independent rotation amount command for the H axis or the C axis, which is input from the acceleration/deceleration processing unit 43, to the imaginary-Y-axis-control-command combining unit 412. In other words, the imaginary-Y-axis-control-command-axis determining unit 414 separates, for each one block, a command of a machining program created in a program coordinate system into a first movement amount command including a movement amount command for the X-Y axes and a second movement amount command including any one of an H-axis independent movement amount command and a C-axis independent movement amount command or both, supplies the first movement amount command to the imaginary-Y-axis-control processing unit 411, and supplies the second movement amount command to the imaginary-Y-axis-control-command combining unit 412.

In the imaginary Y-axis control mode, the imaginary-Y-axis-control processing unit 411 converts the movement amount command for the X-Y axes input from the acceleration/deceleration processing unit 43 into a moving position command (X1, Y1), coordinate-converts the converted moving position command into a moving position command for the X axis, a rotating position command for the H axis, and a rotating position command for the C axis, which are moving position commands of a machine coordinate system serving as an actual coordinate system, and calculates moving target positions (Xr1, Hr1, Cr1) of the X axis, the H axis, and the C axis.

Specifically, the imaginary-Y-axis-control processing unit 411 calculates X-Y moving positions of this time using X-Y moving positions calculated last time and the movement amount command for the X-Y axes input from the acceleration/deceleration processing unit 43. The imaginary-Y-axis-control processing unit 411 coordinate-converts the calculated X-Y moving positions of this time (X1, Y1) according to the following Formulas 1 to 3 and calculates moving positions (Xr1, Hr1, Cr1) in the machine coordinate system.

$$Xr1 = f_1(X1) + f_2(Y1) \qquad \text{Formula 1}$$

$$Hr1 = f_{11}(X1) + f_{12}(Y1) \qquad \text{Formula 2}$$

$$Cr1 = f_{21}(X1) + f_{22}(Y1) \qquad \text{Formula 3}$$

Further, the imaginary-Y-axis-control processing unit 411 calculates a difference between last-time moving positions (Xr0, Hr0, Cr0) and the moving positions of this time (Xr1, Hr1, Cr1) in the machine coordinate system to thereby calculate an X-axis movement amount ($\Delta$Xr1=Xr1−Xr0), an H-axis rotation amount ($\Delta$Hr1=Hr1−Hr0), and a C-axis rotation amount ($\Delta$Cr1=Cr1−Cr0) in the machine coordinate system. The imaginary-Y-axis-control processing unit 411 supplies a movement amount command ($\Delta$Xr1) for the X axis to the axis-data output unit 42 and supplies a rotation amount command ($\Delta Hr1$) for the H axis and a rotation amount command ($\Delta Cr1$) for the C axis to the imaginary-Y-axis-control-command combining unit 412.

When the imaginary-Y-axis-control processing unit 411 does not receive the movement amount command for the X-Y axes, the imaginary-Y-axis-control processing unit 411 supplies rotation amount commands of rotation amount zero, i.e., $\Delta Hr1=0$ and $\Delta Cr1=0$ to the imaginary-Y-axis-control-command combining unit 412 and supplies $\Delta Xr1=0$ to the axis-data output unit 42.

The imaginary-Y-axis-control-command combining unit 412 combines the independent rotation amount commands (any one of $\Delta H2$ and $\Delta C2$ or both) for any one of the H axis and the C axis or both input from the acceleration/deceleration processing unit 43 and the rotation amount command ($\Delta Hr1$) for the H axis and the rotation amount command ($\Delta Cr1$) for the C axis after the coordinate conversion input from the imaginary-Y-axis-control processing unit 411, respectively.

As indicated by the following Formula 4, the imaginary-Y-axis-control-command combining unit 412 combines the independent rotation amount command $\Delta Hr2$ ($=\Delta H2$) for the H axis with the rotation amount command for the H axis $\Delta Hr1$ generated by the imaginary-Y-axis-control processing unit 411 to generate a rotation amount command $\Delta Hr$ for the H axis.

$$\Delta Hr = \Delta Hr1 + \Delta Hr2 \qquad \text{Formula 4}$$

Similarly, as indicated by the following Formula 5, the imaginary-Y-axis-control-command combining unit 412 combines the independent rotation amount command $\Delta Cr2$ ($=\Delta C2$) for the C axis with the rotation amount command $\Delta Cr1$ for the C axis generated by the imaginary-Y-axis-control processing unit 411 to generate a rotation amount command $\Delta Cr$ for the C axis.

$$\Delta Cr = \Delta Cr1 + \Delta Cr2 \qquad \text{Formula 5}$$

The imaginary-Y-axis-control-command combining unit 412 supplies the generated rotation amount command $\Delta Hr$ for the H axis and the generated rotation amount command $\Delta Cr$ for the C axis to the axis-data output unit 42.

The axis-data output unit 42 supplies the movement amount command $\Delta Xr1$ for the X axis, which is supplied from the imaginary-Y-axis-control processing unit 411, to the driving unit 90 and supplies the rotation amount command $\Delta Hr$ for the H axis, which is supplied from the imaginary-Y-axis-control-command combining unit 412, to the driving unit 90.

Figure 3:
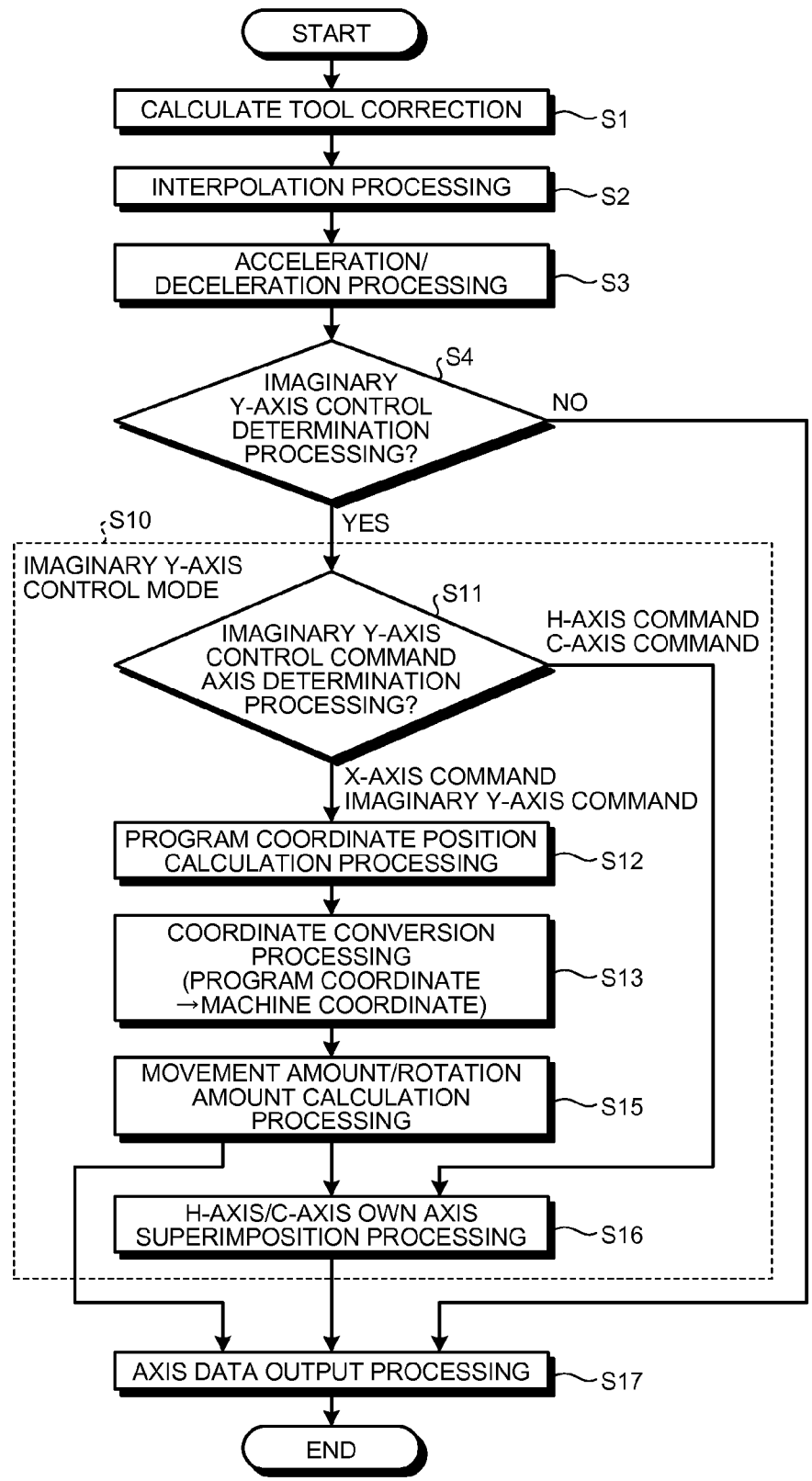
FIG. 3 is a flowchart for explaining the operation of the numerical control apparatus according to the first embodiment.

The operation of the numerical control apparatus 1 according to the first embodiment is explained with reference to FIG. 3. FIG. 3 is a flowchart for explaining the operation of the numerical control apparatus according to the first embodiment.

At step S1, the analysis processing unit 37 calculates the tool correction amounts (Tx, Ty) (see FIG. 6) and causes the storing unit 34 to store the tool correction amounts (Tx, Ty). The analysis processing unit 37 performs analysis processing of the machining program 343, adds the tool correction amounts (Tx, Ty) to a result of the analysis, and passes the analysis result to the interpolation processing unit 38.

At step S2, the interpolation processing unit 38 receives the analysis result (a position command) from the analysis processing unit 37, performs interpolation processing for the analysis result (the position command), and supplies a result of the interpolation processing to the acceleration/deceleration processing unit 43.

At step S3, the acceleration/deceleration processing unit 43 applies acceleration/deceleration processing to the supplied result of the interpolation processing and supplies an acceleration/deceleration processing result to the switch 44.

At step S4, the imaginary-Y-axis-control-switching processing unit 39 determines, based on the imaginary Y-axis control mode signal of the shared area 345, whether imaginary Y-axis control determination processing should be performed. That is, when the numerical control apparatus 1 is in the imaginary Y-axis control mode ("Yes" at step S4), the imaginary-Y-axis-control-switching processing unit 39 advances the processing to step S10. When the numerical control apparatus 1 is in a control mode other than the imaginary Y-axis control mode ("No" at step S4), the imaginary-Y-axis-control-switching processing unit 39 advances the processing to step S17.

At step S10, the imaginary-Y-axis control unit 41 performs processing in the imaginary Y-axis control mode. Specifically, the imaginary-Y-axis control unit 41 performs processing at steps S11 to S16 explained below.

At step S11, the imaginary-Y-axis-control-command-axis determining unit 414 determines, referring to the machining program 343 stored in the storing unit 34 for each one block, whether commands of respective blocks are a movement amount command for the X-Y axes or an independent rotation amount command for any one of the H axis and the C axis or both. When a command by the machining program 343 is a movement amount command for the X-Y axes (e.g., a movement amount command to "X20 Y50" shown in FIG. 5), the imaginary-Y-axis-control-command-axis determining unit 414 supplies the movement amount command for the X-Y axes to the imaginary-Y-axis-control processing unit 411 and advances the processing to step S12. When the command by the machining program 343 is the independent rotation amount command for any one of the H axis and the C axis or both (e.g., an independent rotation amount command by "T1111" or "C180" shown in FIG. 5), the imaginary-Y-axis-control-command-axis determining unit 414 supplies the independent rotation amount command for any one of the H axis and the C axis or both to the imaginary-Y-axis-command combining unit 412 and advances the processing to step S16.

At step S12, the imaginary-Y-axis-control processing unit 411 performs program coordinate position calculation processing. That is, the imaginary-Y-axis-control processing unit 411 calculates moving positions of this time (an X-axis coordinate "X1" and a Y-axis coordinate "Y1") using the movement amount command for the X-Y axes input from the acceleration/deceleration processing unit 43 and X-Y moving positions of the last time.

At step S13, the imaginary-Y-axis-control processing unit 411 performs coordinate conversion processing (conversion processing for a program coordinate to a machine coordinate of the imaginary Y-axis control). That is, the imaginary-Y-axis-control processing unit 411 coordinate-converts the moving positions of this time (X1, Y1) in the program coordinate system according to Formulas 1 to 3 above and calculates moving positions (Xr1, Hr1, Cr1) in the machine control system.

At step S15, the imaginary-Y-axis-control processing unit 411 calculates a difference between the last positions (Xr0, Hr0, Cr0) in the machine coordinate system and the moving positions of this time (Xr1, Hr1, Cr1) to thereby calculate the X-axis movement amount ($\Delta Xr1 = Xr1 - Xr0$), the H-axis rotation amount ($\Delta Hr1 = Hr1 - Hr0$), and the C-axis rotation amount ($\Delta Cr1 = Cr1 - Cr0$) in the machine coordinate system. The imaginary-Y-axis-control processing unit 411 supplies a movement amount command (ΔXr1) for the X axis to the axis-data output unit 42 and advances the processing to step S17. The imaginary-Y-axis-control processing unit 411 supplies a rotation amount command (ΔHr1) of the H axis and a rotation amount command (ΔCr1) for the C axis to the imaginary-Y-axis-control-command combining unit 412 and advances the processing to step S16.

At step S16, as indicated by Formula 4 above, the imaginary-Y-axis-control-command combining unit 412 combines the independent rotation amount command ΔHr2 for the H axis with the rotation amount command ΔHr1 of the H axis generated by the imaginary-Y-axis-control processing unit 411 and generates the rotation amount command ΔHr for the H axis. Similarly, as indicated by Formula 5 above, the imaginary-Y-axis-control-command combining unit 412 combines the independent rotation amount command ΔCr2 for the C axis with the rotation amount command ΔCr1 for the C axis generated by the imaginary-Y-axis-control processing unit 411 and generates the rotation amount command ΔCr for the C axis. The imaginary-Y-axis-control-command combining unit 412 supplies the generated rotation amount command ΔHr for the H axis and the generated rotation amount command ΔCr for the C axis to the axis-data output unit 42.

At step S17, the axis-data output unit 42 performs axis data output processing. That is, the axis-data output unit 42 supplies the movement amount command ΔXr1 for the X axis, which is supplied from the imaginary-Y-axis-control processing 411, to the driving unit 90. The axis-data output unit 42 supplies the rotation amount command ΔHr for the H axis and the rotation amount command ΔCr for the C axis, which are supplied from the imaginary-Y-axis-control-command combining unit 412, to the driving unit 90.

A machining procedure for the work W performed using the numerical control apparatus 1 according to the first embodiment is explained with reference to FIGS. 4 to 6. FIG. 4 is a flowchart for explaining the machining procedure for the work W performed using the numerical control apparatus 1. FIG. 5 is a diagram of described content in the machining program 343 stored in the storing unit 34 of the numerical control apparatus 1. FIG. 6 is a diagram for explaining the action of the turret 905 and the work W conforming to the machining procedure for the work W. In the following explanation, a position in the Z axis is maintained in a fixed state in a series of machining. Driving of feeding action of the Z axis is performed after the series of machining ends.

At step S21 shown in FIG. 4, the numerical control apparatus 1 causes the turret 905 to replace a tool, which should be used for machining, with the tool 9051 for milling according to a description of "N100 T1010" in the machining program 343 shown in FIG. 5.

At step S22, the numerical control apparatus 1 selects the C-axis mode according to a description of "N102 G00 C0" in the machining program 343.

At step S23, the numerical control apparatus 1 positions, according to a description of "N103 G00 X60 H0 Z0" in the machining program 343, the turret 905 and the work W in a position of X=60 where a main axis direction of the tool 9051 and an X-axis direction on an imaginary plane are parallel to each other. The imaginary plane is a plane formed by the X axis and the imaginary Y axis and is a plane corresponding to a XY plane in the program coordinate system.

At step S24, the numerical control apparatus 1 enables the imaginary Y-axis control mode according to a description of "N104 M111" in the machining program 343.

At step S25, the numerical control apparatus 1 moves the tool 9051 to a machining start position (X=20, Y=50) according to a description of "N106 G00 X20 Y50" in the machining program 343.

At step S26, the numerical control apparatus 1 causes the tool 9051 to perform milling from the machining start position (X=20, Y=50) to a machining end position (X=20, Y=−50) according to a description of "N107 G01 X20 Y-50 F1000" in the machining program 343.

At step S129, the numerical control apparatus 1 reverses the work W and positions the work W according to a description of "N109 G00 C180" in the machining program 343.

That is, because a command by "N109 G00 C180" is an independent rotation amount command for the C axis, the imaginary-Y-axis-control-command-axis determining unit 414 supplies the independent rotation amount command for the C axis to the imaginary-Y-axis-control-command combining unit 412. The imaginary-Y-axis-control-command combining unit 412 outputs the independent rotation amount command for the C axis to the axis-data output unit 42 as a rotation amount command (ΔCr) for the C axis. The C-axis-servo control unit 94 drives to rotate the servomotor 904 for the C axis. Consequently, as indicated by S129 in FIG. 6, the numerical control apparatus 1 independently rotates and reverses the work W (positions the work W in C180 on the program coordinate).

At step S32, the numerical control apparatus 1 causes the tool 9051 to perform milling from a machining start position (X=20, Y=−50) to a machining end position (X=20, Y=50) according to a description of "N111 G01 X20 Y50" in the machining program 343.

At step S33, the numerical control apparatus 1 performs positioning of the turret 905 and the work W according to a description of "N113 G00 Y0" in the machining program 343 such that the main axis direction of the tool 9051 and the X-axis direction in the imaginary plane are parallel to each other.

At step S135, the numerical control apparatus 1 causes the turret 905 to replace the tool, which should be used for machining, with the tool 9052 for drilling according to a description of "N114 T1111" in the machining program 343.

That is, because a command by "T1111" is an independent rotation amount command for the H axis, the imaginary-Y-axis-control-command-axis determining unit 414 supplies the independent rotation amount command for the H axis to the imaginary-Y-axis-control-command combining unit 412. The imaginary-Y-axis-control-command combining unit 412 outputs the independent rotation amount command for the H axis to the axis-data output unit 42 as the rotation amount command (ΔHr) for the H axis. The H-axis-servo control unit 92 drives to rotate the servomotor 902 for the H axis. Consequently, as indicated by S135 in FIG. 6, the numerical control apparatus 1 independently rotates the turret 905 and causes the turret 905 to perform a tool replacement operation.

At step S136, the analysis processing unit 37 moves the tool 9052 to a machining start position (X=20, Y=10) according to a description of "N115 G00 X20 Y10" in the machining program 343.

At step S137, the analysis processing unit 37 causes the tool 9052 to perform drilling according to a description of "N116 G83 X5 D40 H3 F100" in the machining program 343.

At step S138, the analysis processing unit 37 positions, according to a description of "N117 G00 X30 Y0" in the machining program 343, the turret 905 and the work W in a position of X=30 where a main axis direction of the tool 9052 and the X-axis direction on the imaginary plane are parallel to each other.

At step S34, the analysis processing unit 37 cancels the imaginary Y-axis control mode according to a description of "N118 M101" in the machining program 343.

Figure 13:
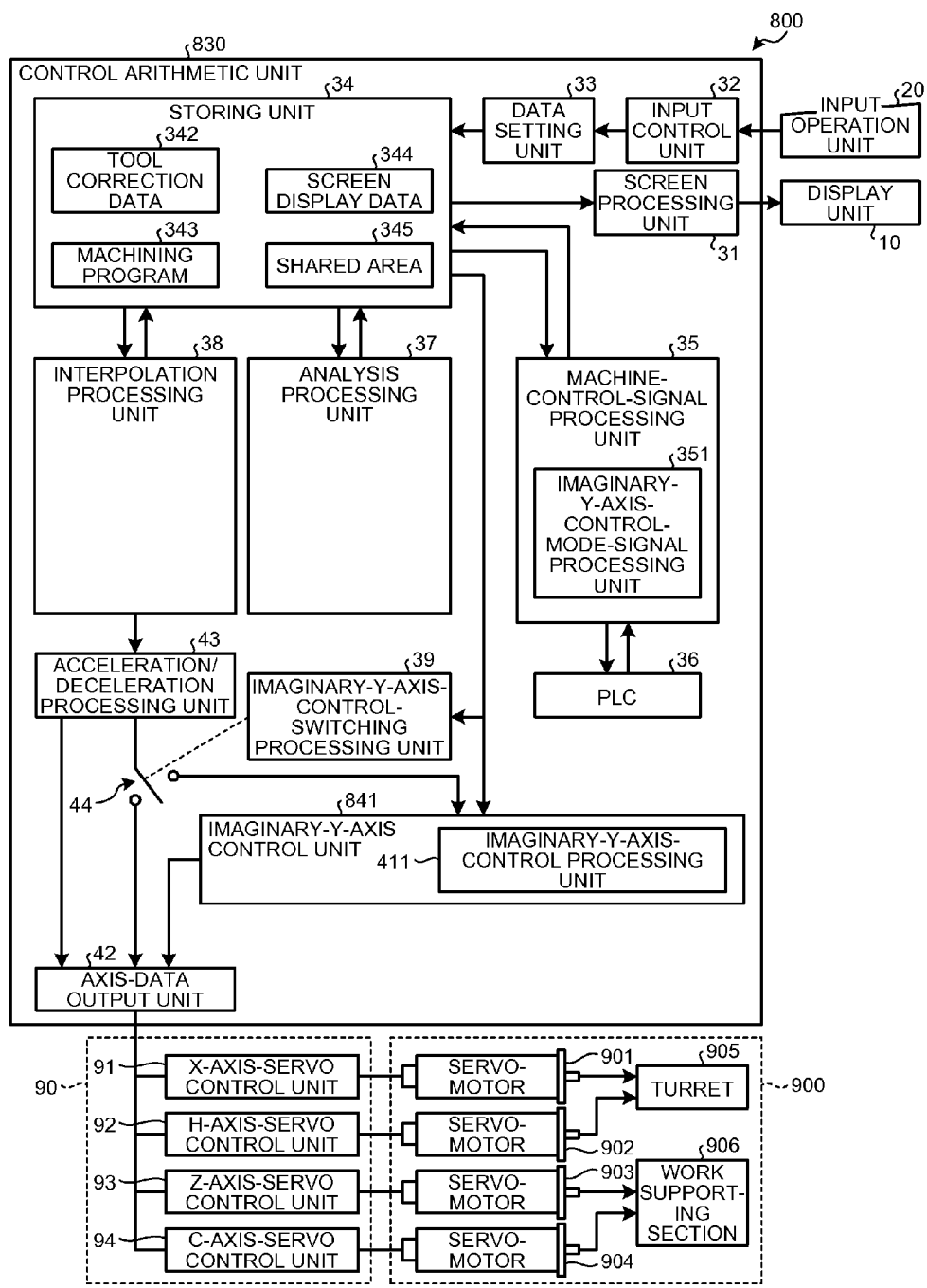
FIG. 13 is a diagram of the configuration of a numerical control apparatus according to a comparative example.
Figure 14:
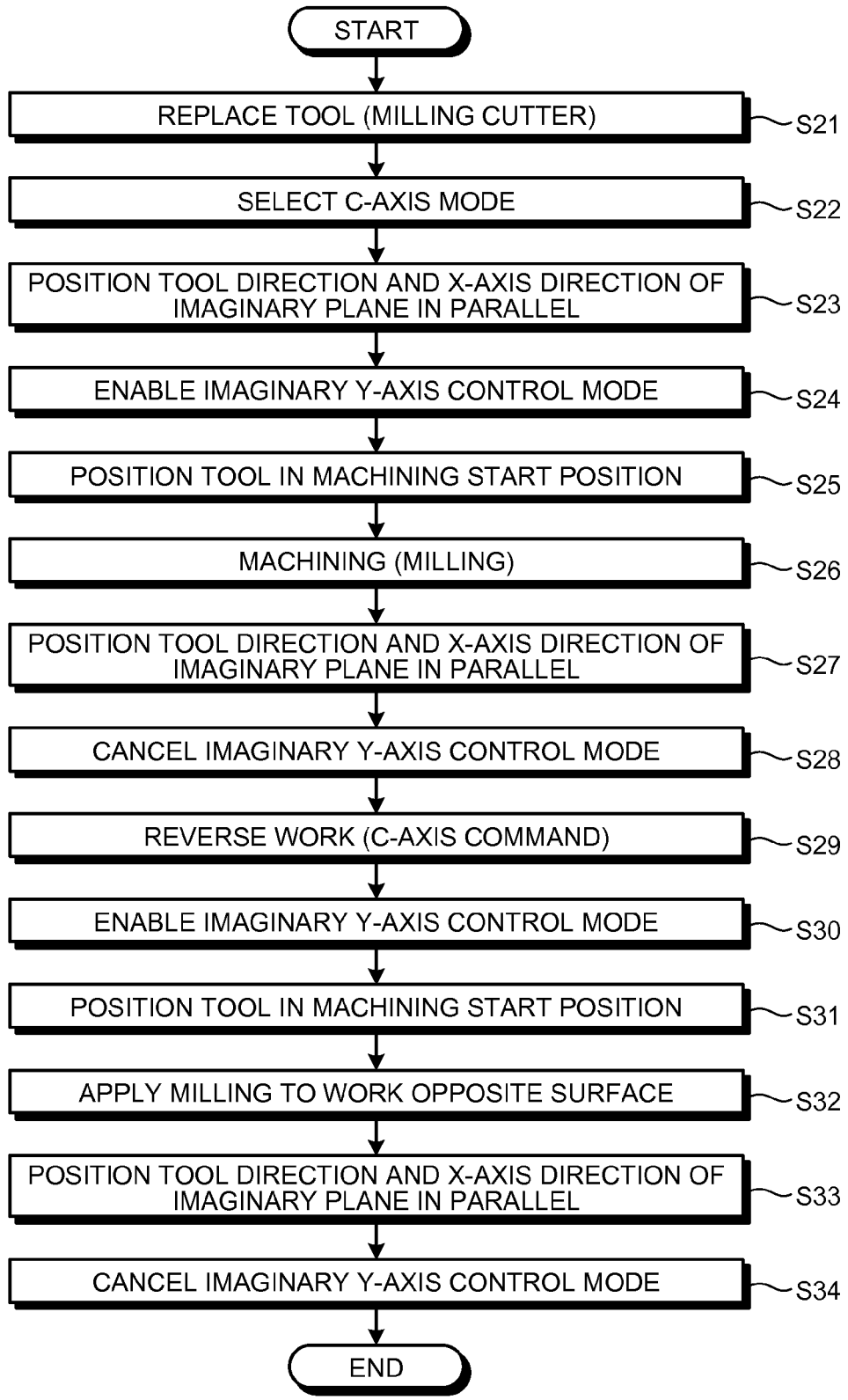
FIG. 14 is a flowchart for explaining a machining procedure for a work in the comparative example.

It is assumed that, as shown in FIG. 13, in a control arithmetic unit 830 of a numerical control apparatus 800, an imaginary-Y-axis control unit 841 does not include the imaginary-Y-axis-control-command-axis determining unit 414 and the imaginary-Y-axis-control-command combining unit 412 shown in FIG. 2. In this case, as shown in FIG. 14, the numerical control apparatus 800 needs to perform steps S27 to S31 between the milling of a region to be machined on one side in the work W (step S26) and the milling of a region to be machined on the other side in the work W (step S32).

That is, at step S27, the numerical control apparatus 800 positions, according to a description of "N19 G00 Y0" in the machining program 343 shown in FIG. 15, the turret 905 and the work W such that the main axis direction of the tool 9051 and the X-axis direction on the imaginary plane are parallel to each other.

At step S28, the numerical control apparatus 800 cancels the imaginary Y-axis control mode according to a description of "N20 M10" in the machining program 343.

At step S29, the numerical control apparatus 800 reverses and positions the work W according to a description of "N21 G00 C180" in the machining program 343.

At step S30, the numerical control apparatus 800 enables the virtual Y-axis control mode again according to a description of "N22 M11" in the machining program 343.

At step S31, the numerical control apparatus 800 moves the tool 9051 to a machining start position according to a description of "N23 G00 X20 Y-50" in the machining program 343.

That is, as shown in FIG. 16, when continuing machining by the imaginary Y-axis control mode while performing the positioning of a work axis (the C axis), every time one machining (step S26) ends, the numerical control apparatus 800 returns to a position where the positioning of the work axis (the C axis) can be performed, positions a tool direction and an imaginary plane X-axis direction in parallel (step S27), cancels the imaginary Y-axis control mode (step S28), performs the positioning of the work axis (the C axis) (step S29) after the cancellation, and enables the imaginary Y-axis control mode again. Therefore, cycle time of the machining tends to be long.

On the other hand, in the first embodiment, in the control arithmetic unit 30 of the numerical control apparatus 1, the imaginary-Y-axis control unit 41 includes the imaginary-Y-axis-control-command-axis determining unit 414 and the imaginary-Y-axis-control-command combining unit 412. That is, when a command by the machining program 343 is an independent rotation amount command for the C axis, the imaginary-Y-axis-control-command-axis determining unit 414 supplies the independent rotation amount command for the C axis to the axis-data output unit 42 through the imaginary-Y-axis-control-command combining unit 412 as a rotation amount command for the C axis. Consequently, because rotation of the work W can be independently performed during the imaginary Y-axis control mode, it is possible to position the work W without cancelling the imaginary Y-axis control mode. That is, it is possible to perform the processing at step S129 shown in FIG. 4 instead of the processing at steps S27 to S31 shown in FIG. 14.

Consequently, because the number of processes in a series of machining can be reduced, it is possible to reduce cycle time of the machining.

In the first embodiment, when a command by the machining program 343 is an independent rotation amount command for the H axis, the imaginary-Y-axis-control-command-axis determining unit 414 supplies the independent rotation amount command for the H axis to the axis-data output unit 42 through the imaginary-Y-axis-command combining unit 412 as a rotation amount command for the H axis. Consequently, because rotation of the turret 905 can be independently performed during the imaginary Y-axis control mode, it is possible to replace the tools 9051 and 9052 without cancelling the imaginary Y-axis control mode. That is, as shown in FIG. 4, after the milling (step S32) ends, it is possible to perform the tool replacement (step S135) without cancelling the imaginary Y-axis control mode. Further, because it is unnecessary to enable the imaginary Y-axis control mode again, it is possible to immediately perform the drilling (step S137). Consequently, because the number of processes in a series of machining can be reduced, it is possible to reduce cycle time of the machining.

Second Embodiment.

The numerical control apparatus 1 according to a second embodiment is explained. In the following explanation, differences from the first embodiment are mainly explained.

Figure 7:
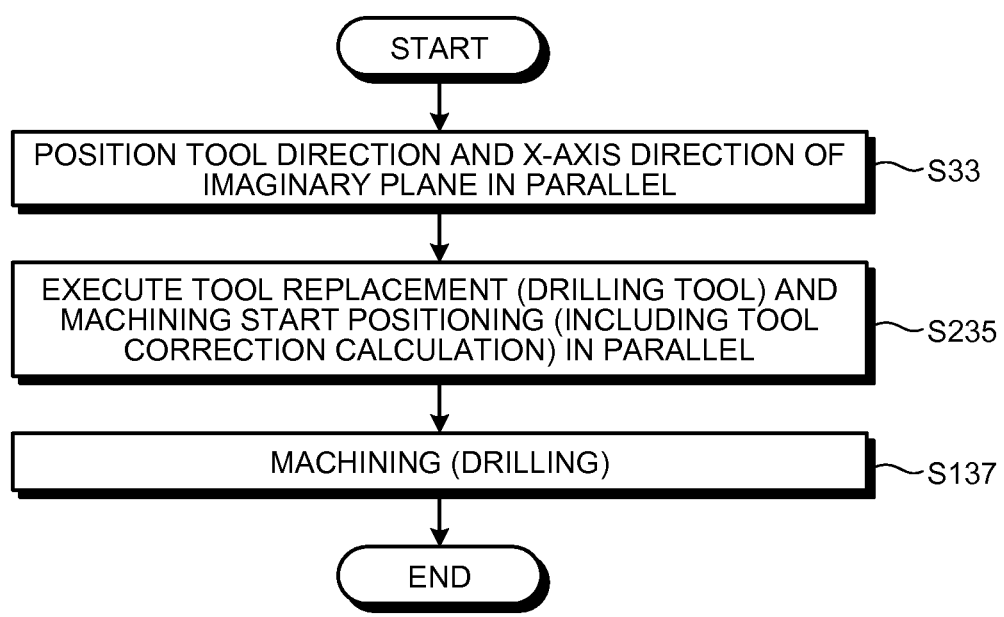
FIG. 7 is a flowchart for explaining a machining procedure for a work in a second embodiment.
Figure 9:
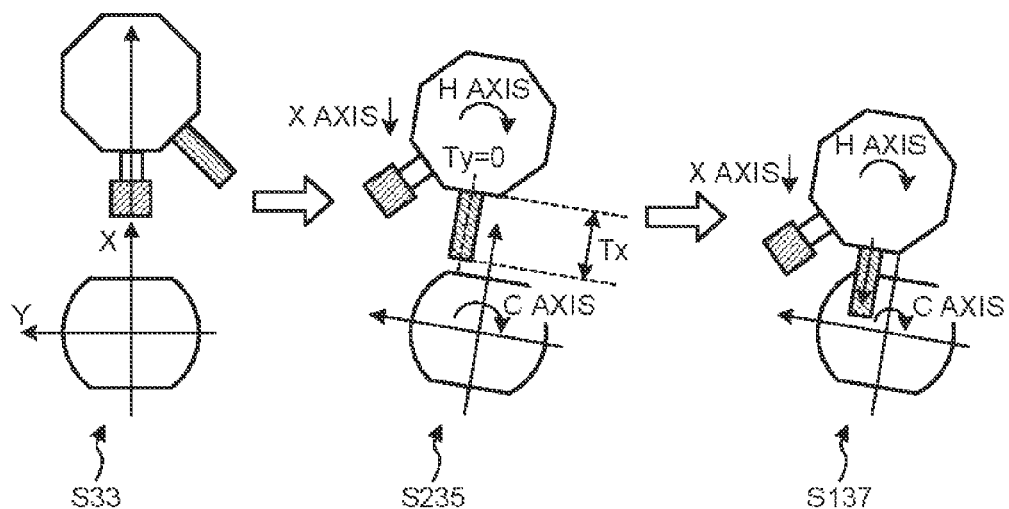
FIG. 9 is a diagram for explaining the machining procedure for the work in the second embodiment.

As shown in FIGS. 7 to 9, the numerical control apparatus 1 according to the second embodiment causes the turret 905 to perform, in parallel, the tool replacement (step S135 shown in FIG. 4) and the movement of the tool 9052 to the machining start position for the work W (step S136 shown in FIG. 4) in the same block in the machining program 343 (step S235 shown in FIG. 7). FIG. 7 is a flowchart for explaining a machining procedure for the work W performed using the numerical control apparatus 1 according to the second embodiment. FIG. 8 is a diagram for explaining described content in the machining program 343 stored in the storing unit 34 of the numerical control apparatus 1 according to the second embodiment. FIG. 9 is a diagram for explaining the action of the turret 905 and the work W conforming to the machining procedure for the work W in the second embodiment.

At step S235 shown in FIG. 7, the processing at step S135 and the processing at step S136 shown in FIG. 4 are performed in parallel. That is, at step S235, the numerical control apparatus 1 causes the turret 905 to replace a tool, which should be used for machining, with the tool 9052 for milling and moves the tool 9052 to a machining start position according to a description of "N211 G00 X20 Y10 T1111" in the machining program 343 shown in FIG. 8.

Specifically, because a command by "G00 X20 Y10" is a movement amount command for X-Y axes, the imaginary-Y-axis-control-command-axis determining unit 414 supplies the movement amount command for the X-Y axes to the imaginary-Y-axis-control processing unit 411. The imaginary-Y-axis-control processing unit 411 generates the movement amount command ($\Delta Xr1$) for the X axis, the rotation amount command ($\Delta Hr1$) for the H axis, and the rotation amount command ($\Delta Cr1$) for the C axis in the machine coordinate system using the movement amount command for the X-Y axes in the program coordinate system. The imaginary-Y-axis-control processing unit 411 supplies the movement amount command ($\Delta Xr1$) for the X axis to the axis-data output unit 42 and supplies the rotation amount command ($\Delta Hr1$) for the H axis and the rotation amount command ($\Delta Cr1$) for the C to the imaginary-Y-axis-control-command combining unit 412.

Because a command by "T1111" is an independent rotation amount command (ΔH2) for the H axis, the imaginary-Y-axis-control-command-axis determining unit 414 supplies the independent rotation amount command (ΔH2) for the H axis to the imaginary-Y-axis-control-command combining unit 412. As indicated by Formula 4 above, the imaginary-Y-axis-control-command combining unit 412 combines the independent rotation amount command ΔH2 for the H axis with a rotation amount command ΔH1 for the H axis generated by the imaginary-Y-axis-control processing unit 411 and generates the rotation amount command ΔHr for the H axis. The imaginary-Y-axis-control-command combining unit 412 supplies the generated rotation amount command ΔHr for the H axis to the axis-data output unit 42.

Further, because the imaginary-Y-axis-control-command combining unit 412 does not receive an independent rotation amount command for the C axis, the imaginary-Y-axis-control-command combining unit 412 combines the independent rotation amount command ΔCr2 (=0) for the C axis of rotation amount zero with the rotation amount command ΔCr1 for the C axis, generates the rotation amount command ΔCr for the C axis, and supplies the generated rotation amount command ΔCr for the C axis to the axis-data output unit 42.

As a result, as indicated by S235 in FIG. 9, it is possible to position the tool 9052 in the machining start position while performing tool replacement.

As explained above, in the second embodiment, the imaginary-Y-axis-control-command combining unit 412 combines the independent rotation amount command for the H axis with the rotation amount command for the H axis generated by the imaginary-Y-axis-control processing unit 411 according to the movement amount command for the X-Y axes and supplies the rotation amount command for the H axis to the axis-data output unit 42. Consequently, it is possible to move the tool to the machining start position for the work W according to the movement amount command for the X-Y axes while independently rotating the turret 905 according to the independent rotation amount command for the H axis to perform tool replacement. The numerical control apparatus 1 causes the turret 905 to perform, in parallel, the tool replacement (step S135 shown in FIG. 4) and the movement of the tool 9052 to the machining start position for the work W (step S136 shown in FIG. 4) in the same block in the machining program 343 (step S235 shown in FIG. 7). Consequently, because the number of processes in a series of machining can be further reduced, it is possible to further reduce cycle time of the machining.

Third Embodiment.

The numerical control apparatus 1 according to a third embodiment is explained. In the following explanation, differences from the first embodiment are mainly explained.

Figure 10:
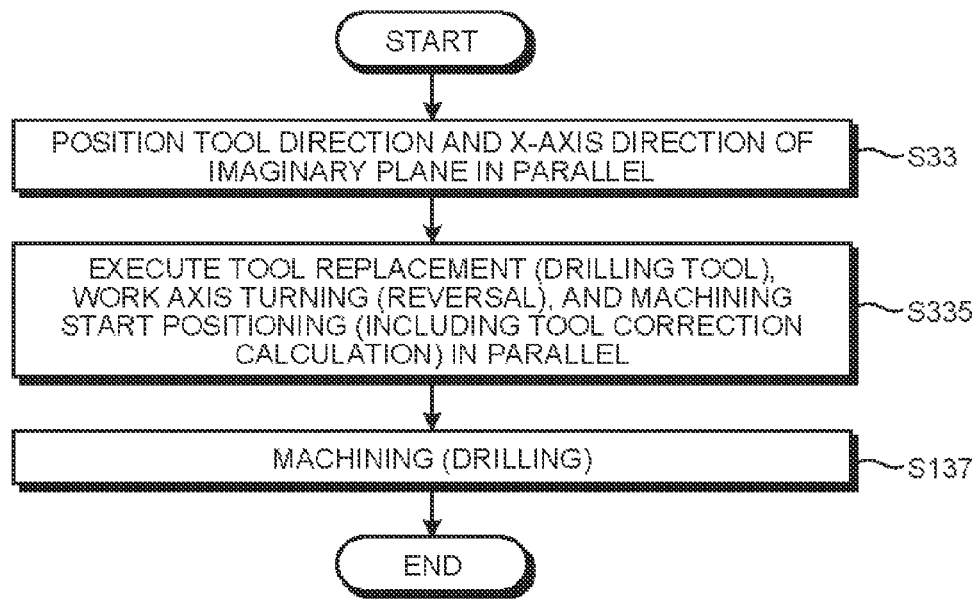
FIG. 10 is a flowchart for explaining a machining procedure for a work in a third embodiment.
Figures 11, 12:
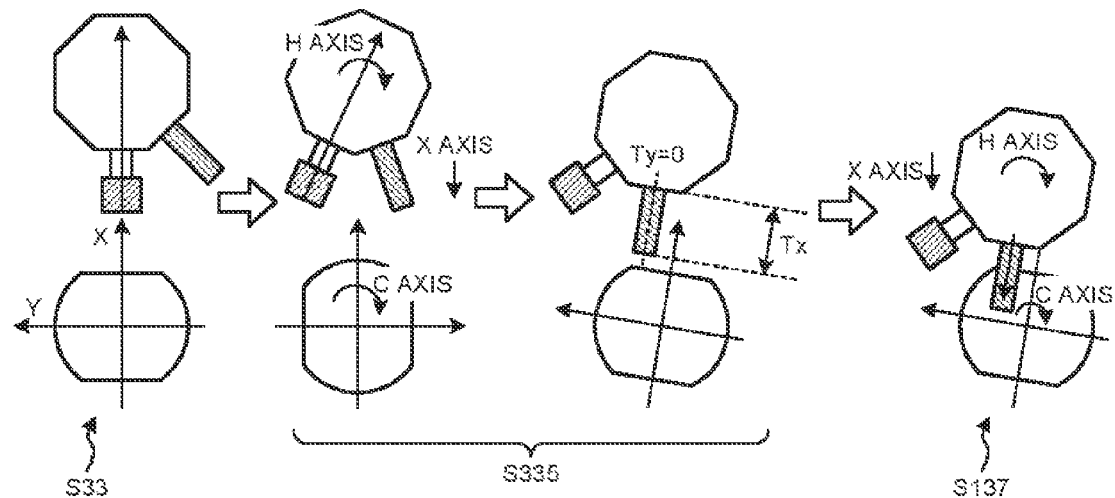
FIG. 11 is a diagram for explaining a machining program in the third embodiment.
FIG. 12 is a diagram for explaining the machining procedure for the work in the third embodiment.

As shown in FIGS. 10 to 12, the numerical control apparatus 1 according to the third embodiment causes the turret 905 to perform, in parallel, the tool replacement (step S135 shown in FIG. 4) and the movement of the tool 9052 to the machining start position for the work W (step S136 shown in FIG. 4) in the same block in the machining program 343 (step S335 shown in FIG. 10). FIG. 10 is a flowchart for explaining a machining procedure for the work W performed using the numerical control apparatus 1 according to the third embodiment. FIG. 11 is a diagram for explaining described content in the machining program 343 stored in the storing unit 34 of the numerical control apparatus 1 according to the third embodiment. FIG. 12 is a diagram for explaining the action of the turret 905 and the work W conforming to the machining procedure for the work W in the third embodiment.

At step S335 shown in FIG. 10, positioning of the work W is performed in parallel in addition to the processing at step S135 and the processing at step S136 shown in FIG. 4. That is, at step S335, the numerical control apparatus 1 causes the turret 905 to move the tool 9052 to the machining start position while replacing a tool, which should be used for machining, with the tool 9052 for drilling and performs positioning of the work W according to a description of "N311 G00 X20 Y10 C-180 T1111" in the machining program 343 shown in FIG. 11.

Specifically, because a command by "G00 X20 Y10" is a movement amount command for the X-Y axes, the imaginary-Y-axis-control-command-axis determining unit 414 supplies the movement amount command for the X-Y axes to the imaginary-Y-axis-control processing unit 411. The imaginary-Y-axis-control processing unit 411 generates the movement amount command (ΔXr1) for the X axis, the rotation amount command (ΔHr1) for the H axis, and the rotation amount command (ΔCr1) for the C axis in the machine coordinate system using the movement amount command for the X-Y axes in the program coordinate system. The imaginary-Y-axis-control processing unit 411 supplies the movement amount command (ΔXr1) for the X axis to the axis-data output unit 42 and supplies the rotation amount command (ΔHr1) for the H axis and the rotation amount command (ΔCr1) for the C to the imaginary-Y-axis-control-command combining unit 412.

Because a command by "C180" is the independent rotation amount command (ΔC2) for the C axis, the imaginary-Y-axis-control-command-axis determining unit 414 supplies the independent rotation amount command (ΔC2) for the C axis to the imaginary-Y-axis-control-command combining unit 412. As indicated by Formula 5 above, the imaginary-Y-axis-control-command combining unit 412 combines the independent rotation amount command ΔCr2 for the C axis with the rotation amount command ΔCr1 for the C axis generated by the imaginary-Y-axis-control processing unit 411 and generates the rotation amount command ΔCr for the C axis. The imaginary-Y-axis-control-command combining unit 412 supplies the generated rotation amount command ΔCr for the C axis to the axis-data output unit 42.

Because a command by "T1111" is the independent rotation amount command (ΔH2) for the H axis, the imaginary-Y-axis-control-command-axis determining unit 414 supplies the independent rotation amount command (ΔH2) for the H axis to the imaginary-Y-axis-control-command combining unit 412. As indicated by Formula 4 above, the imaginary-Y-axis-control-command combining unit 412 combines the independent rotation amount command ΔH2 for the H axis with the rotation amount command ΔH1 for the H axis generated by the imaginary-Y-axis-control processing unit 411 and generates the rotation amount command ΔHr for the H axis. The imaginary-Y-axis-control-command combining unit 412 supplies the generated rotation amount command ΔHr for the H axis to the axis-data output unit 42.

As a result, as indicated by S335 in FIG. 12, it is possible to perform tool replacement and perform positioning of the work W while positioning the tool in a machining start position.

As explained above, in the third embodiment, the imaginary-Y-axis-control-command combining unit 412 combines the independent rotation amount command for the H axis with the rotation amount command for the H axis generated by the imaginary-Y-axis-control processing unit 411 according to the movement amount command for the X-Y axes and supplies the rotation amount command for the H axis to the axis-data output unit 42. At the same time, the imaginary-Y-axis-control-command combining unit 412 combines the independent rotation amount command for the C axis with the rotation amount command for the C axis generated by the imaginary-Y-axis-control processing unit 411 according to the movement amount command for the X-Y axes and supplies the rotation amount command for the C axis to the axis-data output unit 42. Consequently, it is possible to independently rotate the work according to the independent rotation amount command for the C axis to perform positioning of the work and move the tool to the machining start position for the work according to the movement amount command for the X-Y axes while independently rotating the turret according to the independent rotation amount command for the H axis to perform tool replacement. That is, the numerical control apparatus 1 causes the turret 905 to perform, in parallel, the tool replacement (step S135 shown in FIG. 4), positioning of the work W (processing same as step S129 shown in FIG. 4), and the movement of the tool 9052 to the machining start position for the work W (step S136 shown in FIG. 4) in the same block in the machining program 343 (step S335 shown in FIG. 10). Consequently, because the number of processes in a series of machining can be further reduced, it is possible to further reduce cycle time of the machining.

INDUSTRIAL APPLICABILITY

As explained above, the numerical control apparatus according to the present invention is suitable for machining of a work by the imaginary Y-axis control.

REFERENCE SIGNS LIST

1 numerical control apparatus
10 display unit
20 input operation unit
30 control arithmetic unit
31 screen processing unit
32 input control unit
33 data setting unit
34 storing unit
35 machine-control-signal processing unit
36 PLC
37 analysis processing unit
38 interpolation processing unit
39 imaginary-Y-axis-control-switching processing unit
41 imaginary-Y-axis control unit
42 axis-data output unit
43 acceleration/deceleration processing unit
44 switch
90 driving unit
91 X-axis-servo control unit
92 H-axis-servo control unit
93 Z-axis-servo control unit
94 C-axis-servo control unit
342 tool correction data
343 machining program
344 screen display data
345 shared area
351 imaginary-Y-axis-control-mode-signal processing unit
411 imaginary-Y-axis-control processing unit
412 imaginary-Y-axis-control-command combining unit
414 imaginary-Y-axis-control-command-axis determining unit
800 numerical-value control apparatus
830 control arithmetic unit
841 imaginary-Y-axis control unit
900 machine tool
901 servomotor
902 servomotor
903 servomotor
904 servomotor
905 turret
906 work supporting unit
9051 tool
9052 tool
W work

The invention claimed is:

1. A numerical control apparatus that controls a machine tool including an X axis for moving a turret to which a plurality of tools are attached, an H axis for rotating the turret, and a C axis for rotating a work and not including a Y axis orthogonal to the X axis, the numerical control apparatus comprising a unit configured to independently rotate the H axis according to an independent rotation command for the H axis and to perform tool replacement during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command, wherein a rotation center line of the C axis and a rotation center line of the H axis are substantially parallel to each other, and the unit configured to independently rotate the H axis according to the independent rotation command for the H axis and to perform tool replacement includes:

a separating unit configured to separate, for each block among blocks, a command of a machining program created in a program coordinate system into a first movement command and a second movement command, the first movement command including at least one of an X-axis movement command and a Y-axis movement command, the second movement command including at least one of an H-axis independent movement command and a C-axis independent movement command;

a coordinate converting unit configured to convert the first movement command into a command of a machine coordinate system including the X-H-C axes; and a combining unit configured to combine the converted H-axis movement command and the separated H-axis independent movement command and to combine the converted C-axis movement command and the separated C-axis independent movement command.

2. A numerical control apparatus that controls a machine tool including an X axis for moving a turret to which a plurality of tools are attached, an H axis for rotating the turret, and a C axis for rotating a work and not including a Y axis orthogonal to the X axis, the numerical control apparatus comprising a unit configured to independently rotate the C axis according to an independent rotation command for the C axis and to perform positioning of the work during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command, wherein a rotation center line of the C axis and a rotation center line of the H axis are substantially parallel to each other, and the unit configured to independently rotate the C axis according to the independent rotation command for the C axis and to perform positioning of the work includes:

a separating unit configured to separate, for each block among blocks, a command of a machining program created in a program coordinate system into a first movement command and a second movement command, the first movement command including at least one of an X-axis movement command and a Y-axis movement command, the second movement command including at least one of an H-axis independent movement command and a C-axis independent movement command;

a coordinate converting unit configured to convert the first movement command into a command of a machine coordinate system including the X-H-C axes; and a combining unit configured to combine the converted H-axis movement command and the separated H-axis independent movement command and to combine the converted C-axis movement command and the separated C-axis independent movement command.

3. A numerical control apparatus that controls a machine tool including an X axis for moving a turret to which a plurality of tools are attached, an H axis for rotating the turret, and a C axis for rotating a work and not including a Y axis orthogonal to the X axis, the numerical control apparatus comprising a unit configured to independently rotate the H axis according to an independent rotation command for the H axis and to perform tool replacement while moving a tool among the plurality of tools to a machining start position for the work according to a movement command for the X-Y axes during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command, wherein a rotation center line of the C axis and a rotation center line of the H axis are substantially parallel to each other, and the unit configured to independently rotate the H axis according to the independent rotation command for the H axis and to perform tool replacement while moving the tool among the plurality of tools to the machining start position for the work according to the movement command for the X-Y axes includes:

a separating unit configured to separate, for each block among blocks, a command of a machining program created in a program coordinate system into a first movement command and a second movement command, the first movement command including at least one of an X-axis movement command and a Y-axis movement command, the second movement command including at least one of an H-axis independent movement command and a C-axis independent movement command;

a coordinate converting unit configured to convert the first movement command into a command of a machine coordinate system including the X-H-C axes; and a combining unit configured to combine the converted H-axis movement command and the separated H-axis independent movement command and to combine the converted C-axis movement command and the separated C-axis independent movement command.

4. A numerical control apparatus that controls a machine tool including an X axis for moving a turret to which a plurality of tools are attached, a H axis for rotating the turret, and a C axis for rotating a work and not including a Y axis orthogonal to the X axis, the numerical control apparatus comprising a unit configured to independently rotate the C axis according to an independent rotation command for the C axis and to perform positioning of the work while moving the tool to a machining start position for the work according to a movement command for the X-Y axes during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command, wherein a rotation center line of the C axis and a rotation center line of the H axis are substantially parallel to each other, and the unit configured to independently rotate the C axis according to the independent rotation command for the C axis and to perform positioning of the work while moving the tool to the machining start position for the work according to the movement command for the X-Y axes includes:

a separating unit configured to separate, for each block among blocks, a command of a machining program created in a program coordinate system into a first movement command and a second movement command, the first movement command including at least one of an X-axis movement command and a Y-axis movement command, the second movement command including at least one of an H-axis independent movement command and a C-axis independent movement command;

a coordinate converting unit configured to convert the first movement command into a command of a machine coordinate system including the X-H-C axes; and a combining unit configured to combine the converted H-axis movement command and the separated H-axis independent movement command and to combine the converted C-axis movement command and the separated C-axis independent movement command.

5. A numerical control apparatus that controls a machine tool including an X axis for moving a turret to which a plurality of tools are attached, an H axis for rotating the turret, and a C axis for rotating a work and not including a Y axis orthogonal to the X axis, the numerical control apparatus comprising a unit configured to perform tool replacement for independently rotating the H axis according to an independent rotation command for the H axis and to perform positioning of the work for independently rotating the C axis according to an independent rotation command for the C axis while moving a tool among the plurality of tools to a machining start position for the work according to a movement command for the X-Y axes during an imaginary Y-axis control mode, the imaginary Y-axis control mode being a mode for converting an X-Y axes movement command in a machining program into a command in an X-H-C coordinate system and for driving the X axis, the H axis, and the C axis in association with one another according to the converted command, wherein a rotation center line of the C axis and a rotation center line of the H axis are substantially parallel to each other, and the unit configured to perform tool replacement for independently rotating the H axis according to the independent rotation command for the H axis and to perform positioning of the work for independently rotating the C axis according to the independent rotation command for the C axis while moving the tool among the plurality of tools to the machining start position for the work according to the movement command for the X-Y axes includes:

a separating unit configured to separate, for each block among blocks, a command of a machining program created in a program coordinate system into a first movement command and a second movement command, the first movement command including at least one of an X-axis movement command and a Y-axis movement command, the second movement command including at least one of an H-axis independent movement command and a C-axis independent movement command;

a coordinate converting unit configured to convert the first movement command into a command of a machine coordinate system including the X-H-C axes; and a combining unit configured to combine the converted H-axis movement command and the separated H-axis independent movement command and to combine the converted C-axis movement command and the separated C-axis independent movement command.

6. A numerical control apparatus that controls a machine tool including an X axis for moving a turret to which a plurality of tools are attached, an H axis for rotating the turret, and a C axis for rotating a work and not including a Y axis orthogonal to the X axis, wherein a rotation center line of the C axis and a rotation center line of the H axis are substantially parallel to each other, and the numerical control apparatus comprises:

a separating unit configured to separate, for each block among blocks, a command of a machining program created in a program coordinate system into a first movement command and a second movement command during an imaginary Y-axis control mode, the first movement command including at least one of an X-axis movement command and a Y-axis movement command, the second movement command including at least one of an H-axis independent movement command and a C-axis independent movement command, the imaginary Y-axis control mode being a mode for converting an X-Y axes movement command in a machining program into a command in an X-H-C coordinate system and for driving the X axis, the H axis, and the C axis in association with one another according to the converted command;

a coordinate converting unit configured to convert the first movement command into a command of a machine coordinate system including the X-H-C axes;

a combining unit configured to combine the converted H-axis movement command and the separated H-axis independent movement command and to combine the converted C-axis movement command and the separated C-axis independent movement command; and a driving unit configured to control to drive the X axis, the H axis, and the C axis according to the converted X-axis movement command and the combined H-axis movement command and C-axis movement command.

* * * * *